March 19, 1968　　F. K. BOUTWELL ET AL　　3,373,758
HIGH SPEED GATE VALVE
Filed Sept. 27, 1965
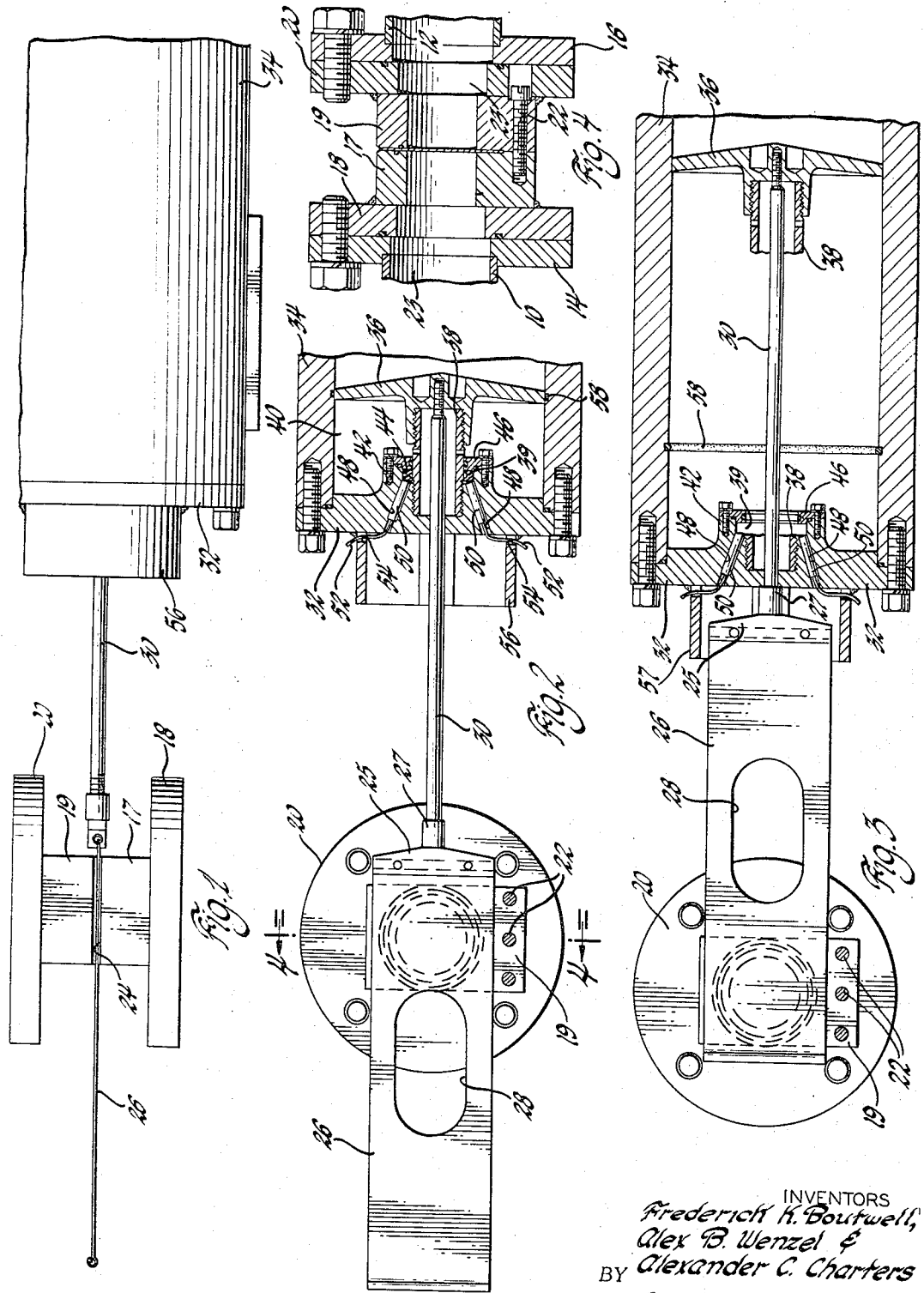
INVENTORS
Frederick K. Boutwell,
Alex B. Wenzel &
BY Alexander C. Charters
F. J. Fodale
ATTORNEY 3,373,758
HIGH SPEED GATE VALVE
Frederick K. Boutwell, Alexander B. Wenzel, and Alexander C. Charters, Santa Barbara, Calif., assignors to General Motors Corporation, Detroit, Mich., a corporation of Delaware
Filed Sept. 27, 1965, Ser. No. 490,543
8 Claims. (Cl. 137—68)

Our invention relates generally to a high speed gate valve and more particularly to an explosively actuated type high speed gate valve especially suitable for use in aeroballistic range testing equipment which requires approximately a two inch opening for admission of a test vehicle.

The invention is best understood in relation to its utility. With the increase in speed of aircraft into the supersonic and hypersonic ranges and with the advent of rocketry and space flight, the conventional wind tunnel is now outmoded as a test bed for aeronautical and astronautical vehicle configurations. The wind tunnel has given way to the aeroballistic range type test. In the aeroballistic test, a projectile in the shape of the vehicle is fired from a gun through a test cell. The gun is generally fired in the atmosphere at low pressure while the test cell is generally filled with a gas which may or may not be air and which may be lower or higher that atmospheric pressure. In order to maintain the test chamber at the desired pressure and uncontaminated by gun gases and other debris, it must be sealed. Yet there must be an open entrance and exit for the high velocity projectile fired by the gun to pass through the test chamber. This opening and sealing is generally accomplished by a valve whose opening is coordinated with the entrance of the projectile. Our invention is directed toward a gate valve for accomplishing this purpose. Since the projectile is traveling at a very high velocity and since the time in which the test chamber conditions degenerate is very short, a very fast acting valve is required. All of the valves known to us are incapable of opening and closing a test chamber in anything less than 0.6 millisecond which we have found to be an unsatisfactorily large amount of time. Accordingly, it is an object of our invention to provide a gate valve which is faster acting than those valves of which we are presently aware.

Another object of our invention is to provide a fast acting gate valve which is explosively actuated and which will open and close a port under approximately 2 milliseconds of elapsed time from the time that a signal is fed to the valve.

The exact nature of this invention as well as other objects and advantages thereof will be readily apparent from consideration of the following specification relating to the annexed drawing in which:

FIGURE 1 is a fragmentary plan view of a gate valve embodying the invention.

FIGURE 2 is a fragmentary side elevation view of the gate valve partially in cross section and showing the gate valve in its starting position.

FIGURE 3 is a fragmentary side elevation view of the gate valve partially in cross section and showing the gate valve in its final position.

FIGURE 4 is a front sectional view of the same taken on the plane indicated by the line 4—4 in FIGURE 2.

Referring now to the figures in more detail and recalling that the utility of our invention is for use with a test chamber, we have shown in FIGURE 4 portions of two such aligned chambers 10 and 12, respectively. The chambers 10 and 12 have flanged ends 14 and 16 onto which are bolted flat face plates 18 and 20 which have collars 17 and 19 welded thereto. The flat face plates 18 and 20 and the collars 17 and 19 have aligned apertures which form a complete passage 23 from chamber 10 to chamber 12. Bolts 22 serve to connect the collars 17 and 19 so that they lie adjacent each other so as to provide a thin narrow gap 24 in which is slidably disposed a thin flat gate 26 as is evident from FIGURES 1 and 4.

Referring to FIGURES 2 and 3, we see that the gate 26 comprises an elongated strip with an elongated central aperture 28. The end portions of the gate 26 on either side of the central aperture 28 are large enough to completely block the passage 23 between the chambers 10 and 12 when the valve is in the positions shown in FIGURES 2 and 3. The right end of the gate 26 is mounted on a support 25 which has a boss 27 threaded to one end of a rod 30. The rod 30 extends through an end wall 32 into a cylinder 34 where its opposite end is threadably received by a piston 36 reciprocable within the cylinder 34. A frangible tube 38 encircles a portion of the rod 30 and has its opposite ends threaded to the end wall 32 and to the piston 36, respectively. The tube 38 thus holds the piston 36 in the position shown in FIGURE 2 wherein a closed chamber 40 is formed by the piston 36 and the end wall 32. Means (not shown) are provided for pressurizing the chamber 40. The end wall 32 has an internal annular boss 42 which forms an annular space 39 with the tube 38. A shaped annular explosive charge 44 is disposed in this space and surrounds the tube 38. A cover plate 46 bolted to the annular boss 42 completely encases the explosive charge 44 to maximize its effects and direct them toward the tube 38. A number of diagonal bores 48 extend from the outer surface of the end wall 32 to the annular space 39 which houses the shaped charge 44. A blasting cap 50 disposed in each of the bores 48 abuts the shaped charge 44. Electrical conducting wires 52 extend from the blasting caps 50 out of the bores 48 and are retained out of the way by apertures 54 in a ring 56 welded to the outer surface of the end wall 32. An annular O-ring seal 58 is provided in the cylinder 34 at the position of the piston 36 when the gate 26 is in the position shown in FIGURE 2.

FIGURE 2 shows the initial or starting position of the gate valve. In this position, the right end portion of the gate 26 blocks the passage 23 between the collars 17 and 19. At this time, the chamber 40 is pressurized so that the pressure on the left side of the piston 36 is greater than the pressure on the right side of the piston 36. The piston 36, however, is retained in its position by the frangible tube 38. When it is desired to actuate the valve, an electrical signal is sent down the wires 52 to detonate the blasting caps 50 which in turn explode the charge 44, breaking the tube 38. With tube 38 broken, the piston 36 is free to move toward the right under the action of the pressure difference existing across it. As the piston 36 moves toward the right, it carries with it rod 30 and gate 26 until gate 26 comes to its final position by the impact of boss 27 as it abuts the end wall 32. The final position corresponds to FIGURE 3 where the left end of the gate 26 completely blocks the passage 23.

In traveling from the position of FIGURE 2 to the position of FIGURE 3, the aperture 28 in gate 26 will have opened the passage 23 for approximately .002 second which is a sufficient amount of time for a projectile to pass from the chamber 10 to the chamber 12 and yet is a small enough lapse of time so that the contamination of the chambers is minimized.

Thus it can be seen that we have invented an explosive actuated gate valve which is capable of opening and closing a passage within .002 second of elapsed time.

It should be understood, of course, that the foregoing disclosure relates to only preferred embodiments of the invention and that it is intended to cover all changes and modifications of the example of the invention herein chosen for the purposes of the disclosure which do not constitute departures from the spirit and scope of the invention.

We claim:
1. A high speed explosively actuated gate valve comprising, in combination:
- a flat member having a passage therethrough, a thin flat gate overlying said flat member and covering said passage, said flat gate being transversely movable in a plane parallel to the surface of said flat member,
- an aperture in said gate, said aperture overlying said passage in at least one position of said gate as it translates from a starting position to a terminating position, said gate having end portions of sufficient size to cover said passage when said gate is in its starting and terminating positions,
- a fixed cylinder with a piston slidable therein having a line of action in said plane, said cylinder adapted to be pressurized on one side of said piston,
- means to operatively connect said piston to said gate,
- a frangible link connecting said one side of said piston to said cylinder to hold said piston in its starting position when it is subjected to a differential pressure,
- an explosive charge adjacent said frangible link, and
- triggering means operatively connected to said charge whereby actuation of said triggering means explodes said charge breaking said link and releasing said piston to allow it to move under differential pressure and translate said gate to uncover said passage for a very short time.

2. A high speed explosively actuated gate valve comprising, in combination:
- a flat member having a passage therethrough,
- a thin flat elongated gate overlying said flat member and transversely movable in a plane parallel to the surface of said flat member between a starting position and a terminating position, said gate having an elongated central aperture and end portions of sufficient size to cover said passage when said gate is in its starting and terminating positions, said aperture overlying said passage for a portion of the travel of said gate from said starting to said terminaitng position,
- a fixed cylinder with a piston slidable therein having a line of action in said plane operatively connected to said gate,
- a frangible link connecting said piston to said cylinder to hold said piston in said starting position when it is subjected to a differential pressure,
- an explosive charge adjacent said frangible link, and
- triggering means operatively connected to said charge whereby actuation of said triggering means explodes said charge breaking said link and releasing said piston to allow it to move under differential pressure and translate said gate to uncover said passage for a very short time.

3. A high speed explosively actuated gate valve comprising, in combination:
- a flat member having a passage therethrough,
- a thin flat gate overlying said flat member and covering said passage, said gate being transversely movable in a plane parallel to the surface of said flat member,
- an aperture in said gate, said aperture overlying said passage in at least one position of said gate as it translates from a starting position to a terminating position, said gate having end portions of sufficient size to cover said passage when said gate is in its starting and terminating positions,
- a fixed cylinder with a piston slidable therein,
- a rod on said piston extending through an end wall of said cylinder and connected to said gate, said rod lying in and being movable in said plane,
- a frangible tube disposed about said rod and connecting said piston to said cylinder end wall to hold said piston in its starting position when it is subjected to a differential pressure, and
- explosive means mounted in said end wall adjacent said frangible tube whereby detonation of said explosive means breaks said tube releasing said piston and allowing it to move under differential pressure to uncover said passage for a very short time.

4. A high speed explosively actuated gate valve comprising, in combination:
- a flat member having a passage therethrough,
- a thin flat gate overlying said flat member and covering said passage, said flat gate being transversely movable in a plane parallel to the surface of said flat member,
- an aperture in said gate, said aperture overlying said passage in at least one position of said gate as it translates from a starting position to a terminating position, said gate having end portions of sufficient size to cover said passage when said gate is in its starting and terminating positions,
- a fixed cylinder with a piston slidable therein, and having a rod on said piston extending through an end wall of said cylinder and connected to said gate, said rod lying in and being movable in said plane,
- a frangible tube disposed about said rod and connecting said piston to said cylinder end wall to hold said piston in its starting position when it is subjected to a differential pressure,
- an explosive charge mounted in said end wall adjacent said frangible tube, and
- electrically actuated triggering means mounted in said end wall adjacent said explosive charge whereby actuation of said triggering means explodes said charge breaking said tube and releasing said piston to allow it to move under differential pressure and translate said gate to uncover said passage for a very short time.

5. A high speed explosively actuated gate valve comprising, in combination:
- a flat member having a passage therethrough,
- a thin flat elongated gate overlying said flat member and transversely movable in a plane parallel to the surface of said flat member between a starting position and a terminating position, said gate having an elongated central aperture and end portions of sufficient size to cover said passage when said gate is in its starting and terminating positions, said aperture overlying said passage for a portion of the travel of said gate from said starting to said terminating position,
- a fixed cylinder with a piston slidable therein,
- a rod on said piston extending through an end wall of said cylinder and connected to said gate, said rod lying in and being movable in said plane,
- a frangible tube disposed about said rod and connecting said piston to said cylinder end wall to hold said piston in its starting position when it is subjected to a differential pressure, and
- explosive means mounted in said end wall adjacent said frangible tube whereby detonation of said explosive means breaks said tube releasing said piston to move under differential pressure to uncover said passage for a very short time.

6. An actuator for a high speed gate valve comprising, in combination:
- a flat member having a passage therethrough,
- a thin flat gate overlying said flat member and covering said passage, said flat gate being transversely movable in a plane parallel to the surface of said flat member,
- an aperture in said gate, said aperture overlying said passage in at least one position of said gate as it translates from a starting position to a terminating position, said gate having end portions of sufficient size to cover said passage when said gate is in its starting and terminating positions, a fixed cylinder with a piston slidable therein, a frangible link connecting said piston to said cylinder to hold said piston in a predetermined position when it is subjected to a differential pressure, an explosive charge adjacent said frangible link, and triggering means operatively connected to said charge whereby actuation of said triggering means explodes said charge breaking said link and releasing said piston to allow it to move under differential pressure.

7. A high speed explosively actuated gate valve comprising, in combination:

a member having a passage therethrough, a slit in said member transverse to said passage, a thin flat elongated gate slidably disposed in said slit and blocking said passage, said gate having an elongated central aperture and end portions of sufficient size to cover said passage when said gate is in its starting and terminating positions, said aperture overlying said passage for a portion of the travel of said gate from said starting to said terminating position, a fixed cylinder with a piston slidable therein, a rod on said piston extending through an end wall of said cylinder and connected to said gate, a frangible tube disposed about said rod and connecting said piston to said cylinder end wall to hold said piston in its starting position when it is subjected to a differential pressure, stop means on said rod engageable with said end wall in said terminating position, an annular explosive charge mounted in said end wall around said frangible tube, and a plurality of electrically actuated blasting caps mounted in said end wall and abutting said explosive charge whereby detonation of said blasting caps explodes said charge breaking said tube and releasing said piston to allow it to move under differential pressure and translate said gate to uncover said passage for a very short time.

8. A high speed explosively actuated gate valve comprising, in combination:

a member having a passage therethrough, a slit in said member transverse to said passage, a thin flat gate slidably disposed in said slit and blocking said passage, an aperture in said gate, said aperture overlying said passage in at least one position of said gate as it translates from a starting position to a terminating position, said gate having end portions of sufficient size to cover said passage when said gate is in its starting and terminating positions, a fixed cylinder with a piston slidable therein operatively connected to said gate, a frangible link connecting said piston to said cylinder to hold said piston in its starting position when it is subjected to a differential pressure, stop means on said piston engageable with said cylinder in said terminating position, an explosive charge adjacent said frangible link, and triggering means operatively connected to said charge whereby actuation of said triggering means explodes said charge breaking said link and releasing said piston to allow it to move under differential pressure and translate said gate to uncover said passage for a very short time.

References Cited

UNITED STATES PATENTS

| 1,283,929 | 11/1918 | Simmons | 251—327 XR |
| 1,769,386 | 7/1930 | Orton | 251—326 |
| 2,557,448 | 6/1951 | Mathisen | 137—68 |
| 3,022,793 | 2/1962 | Thorp | 137—68 |
| 3,111,133 | 11/1963 | Fulton et al. | 137—68 |

WILLIAM F. O'DEA, *Primary Examiner.*

R. GERARD, *Assistant Examiner.*